United States Patent Office 2,977,361
Patented Mar. 28, 1961

2,977,361

NOVEL s-DIHYDRO-TRIAZINE AND METHOD

George H. Hitchings, Yonkers, and Barbara Roth, Scarsdale, N.Y., assignors to Burroughs Wellcome & Co. (U.S.A.) Inc., Tuckahoe, N.Y., a corporation of New York No Drawing. Filed Aug. 19, 1959, Ser. No. 834,674

1 Claim. (Cl. 260—249.9)

This invention relates to a new type of s-dihydrotriazine which is useful for its effects on intestinal parasites, notably pinworms. The s-dihydrotriazine found to have this unusual activity, combined with low toxicity, is represented by the formula

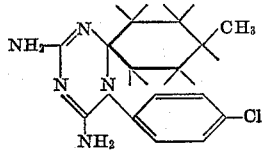

The toxicity of the compound of this invention differs markedly from those of closely related dihydrotriazines known to the art and also from several new closely related derivatives. Whereas the related dihydrotriazines all have approximately the same toxicity to mice, the compound of this invention is unique in being many time less toxic than any of the other derivatives. Thus, although the doses of the more active of these dihydrotriazines required to eliminate the worm *Syphacia obvelata* from mice infested with this parasite are approximately equal, the therapeutic ratios of toxic dose to effective dose vary widely. This is illustrated in the following table, which compares the effects of various dihydrotriazines on the elimination of the parasite, as well as the therapeutic ratios. In these experiments, mice infested with the parasite were given three successive equal daily doses of drug. The daily dosages were varied until at least 90% of the worms were eliminated.

In the table to follow, the parasites removed during this period and for one additional day were counted and recorded; the animals then were killed and any remaining worms were counted. The activity is expressed as the percentage of worms eliminated, i.e. worms eliminated over the total number of worms, multiplied by 100. The therapeutic ratio is expressed as the toxic dose required to kill 50% of the animals ($LD_{50}$) divided by the effective dose required to eliminate over 90% of the parasites. The drug in all cases was administered per os as the hydrochloride.

TABLE

| 2,4-Diamino-1,6-di-H-1,3,5-triazine 6,6-Substituents | Benzene Subst. | Activity, percent Dose, mg./kg. 300 | Activity, percent Dose, mg./kg. 400 | $LD_{50}$ orally, mg./kg. | Therapeutic Ratio |
|---|---|---|---|---|---|
| —CH$_2$CH$_2$CHCH$_2$CH$_2$— <br> \|<br>CH$_3$ | p-Cl | 100 | | >8,000 | >27.0 |
| —CH$_2$CH$_2$CH$_2$CH$_2$CH$_2$— | p-Cl | 97 | | 1,058 | 3.5 |
| —CH$_2$CHCH$_2$CH$_2$CH$_2$— <br> \|<br>CH$_3$ | p-Cl | 99 | | 1,100 | 3.7 |
| —CH$_2$CH$_2$CH$_2$CH$_2$— | p-Cl | 55 | 100 | 1,000 | 2.5 |
| —CH$_2$CH$_2$CHCH$_2$CH$_2$— <br> \|<br>CH$_3$ | o-C$_2$H$_5$ | 100 | | 1,000 | 3.3 |
| —CH$_2$CH$_2$CHCH$_2$CH$_2$— <br> \|<br>CH$_3$ | o-CH$_3$ | 73 | 100 | 900 | 2.3 |
| —CH$_2$CH$_2$CH$_2$CH$_2$CH$_2$— | o,o'-(CH$_3$)$_2$ | 99 | | 612 | 2.0 |
| —CH$_2$CH$_2$CH$_2$CH$_2$— | o-C$_2$H$_5$ | 100 | | 436 | 1.5 |

It will be noted from the above table that there is a narrow margin of safety with all derivatives except the product of our invention, in which case the toxic dose is more than 27 times greater than the effective therapeutic dose. This finding is totally unexpected.

This new substance is conveniently prepared by the condensation of p-chloroaniline, 4-methylcyclohexanone, and dicyandiamide in the presence of an acid, as illustrated in the following example. Since the free triazine is somewhat unstable, having a tendency to rearrange to to a 2-amino-4-anilinodihydrotriazine, it is preferably prepared and administered in the form of its non-toxic salts. The nature of the acid used in these salts is immaterial provided it is therapeutically acceptable. Therapeutically acceptable salts include hydrochloride, sulfate, hydrobromide, citrate, acetate and phosphate.

The invention is illustrated, but not limited, by the following example.

Example

A mixture of 127.5 grams of p-chloroaniline, 94 g. of dicyandiamide, 224 ml. of 4-methylcyclohexanone, 83.5 ml. of concentrated hydrochloric acid, and 100 ml.

of absolute alcohol is heated on the steam bath under reflux for 18 hours. A clear solution is formed initially, which very shortly begins to deposit a crystalline precipitate. At the end of the heating period, the mixture is chilled, and the product isolated by filtration. After two recrystallizations from 40% alcohol there is obtained 2,4-diamino - 1-(p-chlorophenyl)-6,6-(3'-methylpentamethylene)-1,6-dihydro-1,3,5-triazine hydrochloride, melting at 229° C.

What we claim is:

A compound selected from the class consisting of 2,4-diamino - 1-(p-chlorophenyl)-6,6-(3'-methylpentamethylene)-1,6-lihydro-1,3,5-triazine and its therapeutically acceptable salts.

References Cited in the file of this patent

UNITED STATES PATENTS

| | | |
|---|---|---|
| 2,273,382 | Simons | Feb. 17, 1942 |
| 2,437,691 | Grun | Mar. 16, 1948 |
| 2,517,824 | Appelquest | Aug. 8, 1950 |
| 2,897,116 | Hitchings et al. | July 28, 1959 |
| 2,900,385 | Modest | Aug. 18, 1959 |

FOREIGN PATENTS

| | | |
|---|---|---|
| 720,456 | Great Britain | Dec. 22, 1954 |

OTHER REFERENCES

Hewitt et al.: Am. J. Tropical Med. and Hygiene, vol. 3, No. 2, pp. 225–231 (noting in particular D 40 on p. 227) (1954).